(12) United States Patent
Lajiness et al.

(10) Patent No.: US 6,469,659 B1
(45) Date of Patent: Oct. 22, 2002

(54) APPARATUS AND METHOD FOR DETECTING RADAR OBSTRUCTION

(75) Inventors: Gregory George Lajiness, Tucson, AZ (US); Stephen William Alland, Tucson, AZ (US); James Fredrick Searcy, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/847,207

(22) Filed: May 3, 2001

(51) Int. Cl.[7] .............................. G01S 7/40; G01S 13/93
(52) U.S. Cl. .................... 342/173; 342/70; 342/89; 342/91; 342/159; 342/165; 342/195
(58) Field of Search ................................ 342/70, 71, 72, 342/159–175, 192–197, 27, 28, 89–103

(56) References Cited

U.S. PATENT DOCUMENTS 5,929,802 A * 7/1999 Russell et al. ............... 342/70
5,959,570 A * 9/1999 Russell ........................ 342/70
6,107,956 A * 8/2000 Russell et al. ............... 342/70

* cited by examiner

Primary Examiner—Bernarr E. Gregory
(74) Attorney, Agent, or Firm—Robert M. Sigler (57) ABSTRACT

An apparatus and method for detecting radar system blockage includes a radar system having an antenna unit configured to transmit radar signals and receive reflected radar signals. In one embodiment, fixed frequency continuous wave radar signals are transmitted, and corresponding reflected signals are sampled and processed to determine a mainbeam clutter signal peak in frequency bins near those corresponding to vehicle speed. If this peak is less than a power threshold, the antenna unit is at least partially blocked. In another embodiment, a number of most recent reflected tracking signal amplitudes are sampled, normalized to a predefined range value and filtered to produce a smoothed tracking amplitude. If the smoothed tracking amplitude drops below an amplitude threshold, the antenna unit is at least partially blocked. The two embodiments may be combined to determine a radar antenna blockage status as a function of both techniques.

20 Claims, 5 Drawing Sheets

| FRBF | SRBF | BLOCKAGE STATUS |
|---|---|---|
| CLEAR | CLEAR | NO BLOCKAGE |
| CLEAR | SET | AT LEAST PARTIAL BLOCKAGE |
| SET | CLEAR | AT LEAST PARTIAL BLOCKAGE |
| SET | SET | AT LEAST PARTIAL BLOCKAGE |

FIG. 6

FIG. 5A
FROM/TO FIG. 5B

FIG. 5B

APPARATUS AND METHOD FOR DETECTING RADAR OBSTRUCTION

TECHNICAL FIELD

The present invention relates generally to radar transmitting and receiving devices, and more specifically to systems for detecting obstruction material on or about a radar antenna carried by a motor vehicle.

BACKGROUND OF THE INVENTION

Systems for tracking object position and/or velocity are well known and have been widely implemented in a variety of applications. Examples include, but are not limited to, tracking aircraft position, detecting motor vehicle speed and tracking both the position and velocity of a leading vehicle in an automotive adaptive cruise control and/or collision warning system.

Many such radar systems rely on the Doppler principle, where a radio frequency signal is transmitted by an antenna into space, and where at least some of the signal is reflected off an object back to the transmitter at a different frequency. The reflected radiation can then be processed to determine the velocity and/or position of the object relative to the transmitter. Additionally, many radar systems encode the transmitted frequency such that the reflected signal may be processed to determine the relative velocity of the object, the Doppler component, and the relative range of the object from the transmitter.

Typical radar systems used in motor vehicle applications include a radar antenna surrounded or encased by a protective radome. In conventional motor vehicle applications, the antenna/radome combination is mounted to the front of the vehicle; typically behind the front bumper or grill, in a forward-looking radar system application, or to the rear of the vehicle; typically behind the rear bumper, in a rearward-looking radar system. Mounted at such locations, the antenna/radome combination is accordingly susceptible to obstructions that may result in degraded, or even total loss of, system performance. Sources of such obstructions may include snow, slush, ice, mud and other debris, as well as radar signal impeding structural items mounted to the vehicle in line with one or more signal transmission/detection axes. In any case, it is important, if not imperative, that the radar system includes some type of mechanism for detecting radar obstruction or blockage.

Several approaches to detecting radar obstruction or blockage are known. For example, one conventional radar blockage detection technique includes calibrating the radar system using an external target of known reflectivity at a specified distance, and then periodically testing the system using this calibration technique. However, while this technique may work well for stationary systems or systems that can easily transport and accurately position an external target, it is impractical for use with a mobile platform for detecting obstructions in real time.

Another known radar blockage technique that is particularly useful with mobile platforms such as motor vehicles includes outfitting the radome with a grid or other pattern of electrical conductors. By measuring the electrical impedance of the grid, it is possible to determine with acceptable accuracy the presence of electrically conductive foreign matter that may have accumulated on the radome, such as ice, snow, slush and/or mud. However, this approach unnecessarily adds significant cost and complexity to the system in the form of both hardware and software. Moreover, this approach is limited to detection of radar blockage matter accumulated only on the radome itself, and is generally not operable to detect the presence of other blockage matter that may have formed elsewhere in the transmission/receiving path of the radar antenna.

What is therefore needed is an improved radar obstruction or blockage detection system that overcomes the foregoing drawbacks of known vehicular radar obstruction detection systems.

SUMMARY OF THE INVENTION

The foregoing shortcomings of the prior art are addressed by the present invention. In accordance with one aspect of the present invention, a system for detecting radar blockage comprises a radar unit having an antenna configured for transmitting radar signals and for receiving reflected radar signals, a vehicle speed sensor producing a vehicle speed signal indicative of a travelling speed of a vehicle carrying the radar unit, and a control computer responsive to at least some of the reflected radar signals to compute a relative radar power signal as a function of frequency, the control computer responsive to the vehicle speed signal to determine a mainbeam clutter peak of the relative radar power signal along a number of Doppler frequencies defined by the travelling speed, the control computer setting a first radar blockage flag if the mainbeam clutter peak is below a power threshold value.

In accordance with another aspect of the present invention, a system for detecting radar blockage comprises a radar unit carried by a motor vehicle, the radar unit having an antenna configured for transmitting radar signals and for receiving reflected radar signals, and a control computer responsive to the reflected radar signals to track at least one object external to the vehicle, the control computer normalizing corresponding tracking amplitudes of the reflected radar signals to a predefined tracking distance and filtering the normalized tracking amplitudes to produce a smoothed tracking amplitude, the control computer setting a first radar blockage flag if the smoothed tracking amplitude drops below an amplitude threshold value.

In accordance with yet another aspect of the present invention, a method for detecting radar blockage comprises the steps of transmitting a radar signal with a radar system carried by a motor vehicle, receiving reflected radar signals resulting from the transmitting step, processing the reflected radar signals to produce a relative power signal as a function of frequency, determining a mainbeam clutter peak of the relative power signal based on frequencies corresponding to those about a travelling speed of the vehicle, and setting a first radar blockage flag if the mainbeam clutter peak is below a power threshold value.

In accordance with a further aspect of the present invention, a method for detecting radar blockage comprises the steps of transmitting a radar signal with a radar system carried by a motor vehicle, receiving reflected radar signals resulting from the transmitting step, processing the reflected radar signals to track at least one object external to the vehicle, normalizing corresponding tracking amplitudes of the reflected radar signals to a predefined tracking distance, filtering the normalized tracking amplitudes to produce a smoothed tracking amplitude, and setting a first radar blockage flag if the smoothed tracking amplitude drops below an amplitude threshold value.

One object of the present invention is to provide a system for detecting blockage of a radar transmitting and receiving antenna forming part of a radar system carried by a motor vehicle.

Another object of the present invention is to provide such a system for detecting radar blockage by comparing the mainbeam clutter peaks of reflected radar signals with a predefined power threshold value.

Still another object of the present invention is to provide such a system for detecting radar blockage by comparing a smoothed, normalized tracking amplitude with a predefined amplitude threshold value.

These and other objects of the present invention will become more apparent from the following description of the preferred embodiment.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
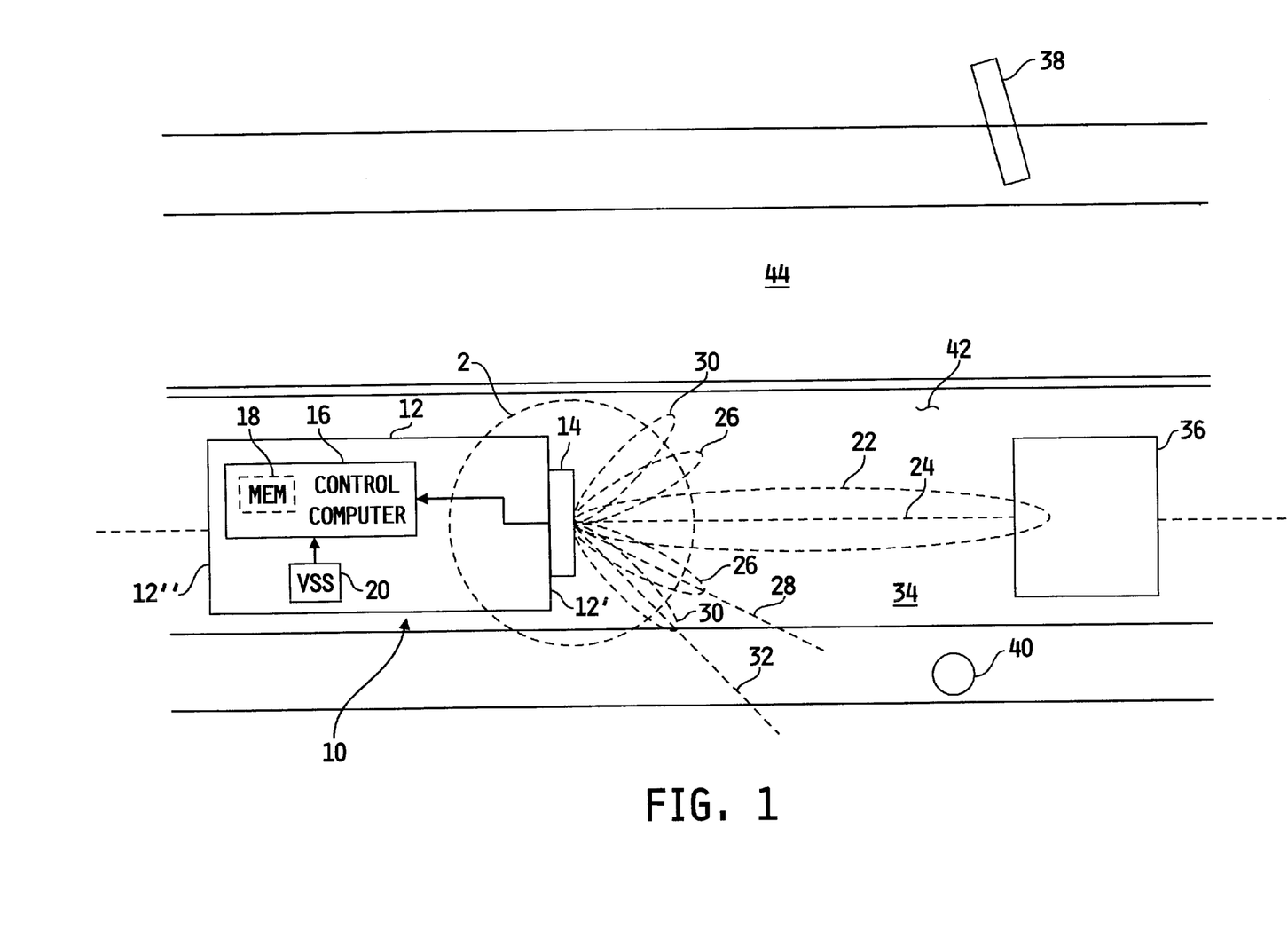
FIG. 1 is a diagrammatic illustration of a forward looking radar unit carried by a motor vehicle, including a system for detecting radar blockage in accordance with the present invention.

Referring now to FIG. 1, one preferred embodiment of a forward looking radar unit 10 carried by a motor vehicle, including a system for detecting radar obstruction or blockage, in accordance with the present invention, is shown. A motor vehicle 12 includes a front 12' and an opposite rear 12", wherein a radar transmitting/receiving antenna unit 14 is mounted to the front 12' of the vehicle 12. In this embodiment, the radar unit 10 may comprise at least a portion of a known forward-looking radar system suitable for tracking a leading vehicle 36 in an adaptive cruise control system, and/or may comprise at least a portion of a known collision avoidance system. Alternatively or additionally, a radar antenna unit identical to unit 14 may be mounted to a rear portion 12" of vehicle 12 and/or to either side thereof, to provide a rearward-looking or side-ward-looking radar system as part of a collision avoidance system.

In any case, antenna unit 14 is electrically connected to a control computer 16 having a memory unit 18 associated therewith. Control computer 16 is of known construction and preferably microprocessor-based, and is generally operable to manage and control the overall operation of the radar system, adaptive cruise control system and/or collision avoidance system. The system further includes a vehicle speed sensor 20 electrically connected to control computer 16, wherein vehicle speed sensor 20 is of known construction and is operable to provide control computer 16 with a vehicle speed signal indicative of a travelling speed of the vehicle 12.

The radar obstruction or blockage detection system illustrated in FIG. 1 generally includes at least a forward looking antenna 12 from which radar signals are transmitted and received. In at least one embodiment of the invention, the transmitted radar signals may include Continuous Wave radar (CW) signals in conjunction with Frequency Modulated Continuous Wave (FMCW) radar signals to detect the presence, and likewise, the absence, of objects external to the vehicle 12. While the following description of the present invention is limited to the particular use of the radar systems in automotive vehicles, it is to be understood that the present invention contemplates extending use of the concepts described herein to any mobile platform wherein radar signals are used to determine the presence and absence of objects external to the mobile platform. In any case, the radar transmitting/receiving antenna 14 is illustrated in FIG. 1 as transmitting a so-called "mainbeam" radar signal 22 along an axis 24 parallel with the travelling direction of vehicle 12, along with a number of so-called "sidelobe" signals 26 and 30 each directed along predetermined axes 28 and 32 respectively, wherein the angles between the various sidelobe signals and the mainbeam signal are predetermined.

In the forward-looking implementation illustrated in FIG. 1, the radar system carried by vehicle 12 may be operable, as is known in the art, to track at least the speed and position of a leading vehicle 36 pursuant to an adaptive cruise control algorithm executed by control computer 12. Alternatively or additionally, the radar system may be operable, as is known in the art, to detect the presence, relative locations and velocities of objects, such as object 40 disposed along road path 34 and/or object 38 disposed alongside road path 44.

In operation, the radar transmitting/receiving antenna unit 14 is operable, as is known in the art, to transmit a number of radar signals as illustrated in FIG. 1, and to receive radar signals reflected back to antenna unit 14 by one or more objects 36, 28, 40, as well as by road surface 42. Control computer 16 is responsive to the detected radar signals reflected back to antenna unit 14 to compute relative velocity, position and/or range information relating to the one or more objects 36, 38, 40, or to road surface 42, in a known manner.

Figure 2:
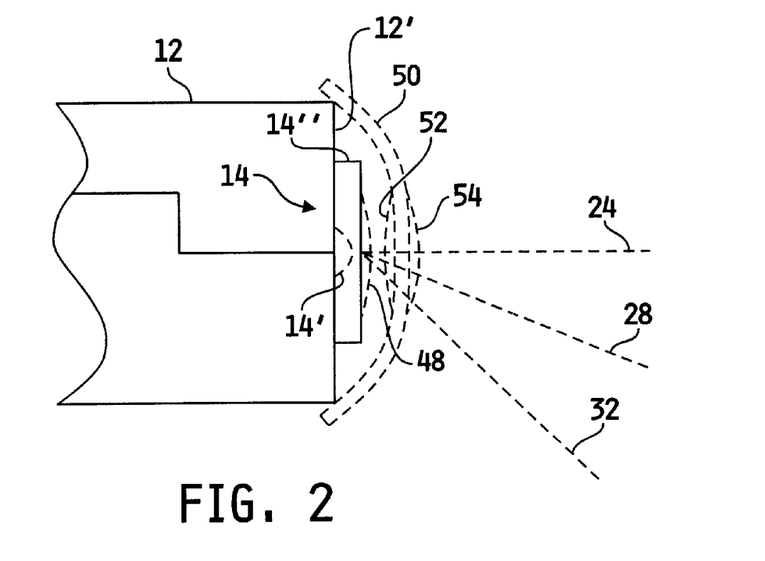
FIG. 2 is a magnified view of the radar unit of FIG. 1 illustrating a number of possible radar blockage scenarios.

Referring now to FIG. 2, a magnified view of the radar transmitting/receiving antenna unit 14 of FIG. 1, illustrating a number of possible radar obstruction or blockage scenarios, is shown. Radar transmitting/receiving antenna unit 14 preferably includes a radar transmitting/receiving antenna 14' surrounded or encased by a protective radome structure 14", wherein the combination 14 is mounted to the front 12' of the motor vehicle 12. The radome structure 14" is preferably formed of a known low radar signal impedance material so as not to attenuate either transmitted or reflected radar signals. In one embodiment, the antenna unit 14 is mounted to, or flush with, the front of the vehicle 12'. In this case, the radome structure 14" is fully exposed to the elements and may accordingly experience a build up of radar blockage or obstruction material 48 on its surface, such as mud, snow, ice, slush, tar, asphalt, or other debris. Alternatively, the antenna unit 14 may be mounted to the front 12' of the vehicle 12 behind a front bumper, grill or other facia 50 as shown in phantom in FIG. 2. In this case, radar blockage or obstruction material may accumulate on the surface of the radome 14" as shown at 48, or on the rearward facing portion of the bumper, grill or other facia 50 as shown at 52, and/or on the forward facing portion of the bumper, grill or other facia 50 as shown at 54. In any case, the radar blockage or obstruction material 48, 52 and/or 54 need not necessarily be environmentally-induced, as describe above by way of example, but may instead result from one or more radar signal impeding or attenuating structures affixed to the vehicle 12 in line with the radome structure 14" or otherwise disposed near antenna 14' in line with one or more of the radar signal transmitting/receiving axes 24, 28, 32.

Figure 3:
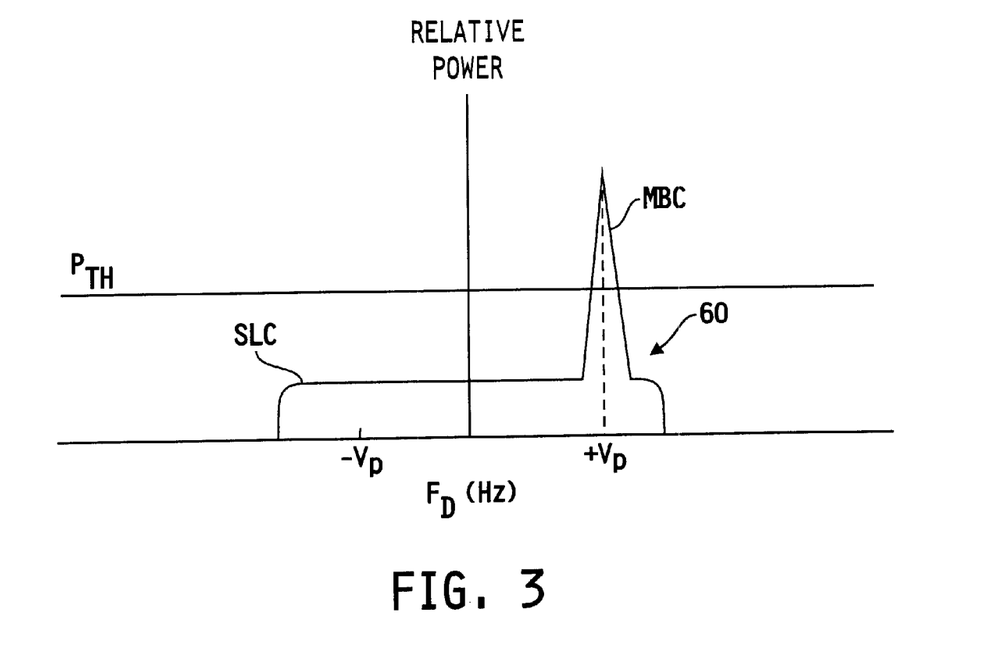
FIG. 3 is a plot of reflected radar power vs. certain Doppler frequency bins illustrating a strategy for detecting one radar blockage parameter, in accordance with the present invention.

In accordance with the present invention, the control computer 16 is configured to process reflected radar signals received by antenna unit 14 to determine whether the antenna unit 14 is at least partially blocked or obstructed as just described. Referring to FIG. 3, a plot 60 of reflected radar power vs. certain Doppler frequency bins is shown illustrating a preferred strategy for detecting one radar blockage parameter, in accordance with the present invention.

In automotive applications, mainbeam and sidelobe radar reflections from the road surface 42, roadside surface and roadside objects (e.g., 38, 40) are received by the radar antenna unit 14. These clutter signals are distributed in range, azimuth and, for a moving platform such as vehicle 12, Doppler. For a fixed-frequency waveform, radar reflections received in the mainbeam axis from surface clutter distributed over range are compressed into a narrow band of Doppler frequencies determined by the platform (vehicle) speed and antenna beamwidths. The surface clutter in the mainbeam axis is thus enhanced with a fixed-frequency CW radar waveform as compared with other radar signal waveforms, wherein this information is processed in accordance with the present invention to serve as one indicator of whether the antenna unit 14 is at least partially blocked.

In general, the equation for signal frequencies ($f_s$) generated (reflected) by a single target is given as:

$$f_s = -a*r + f_d \quad (1),$$

where,

"a" is the radar waveform slope constant,

"r" is the target range, and $f_d$ is the Doppler frequency of the radar signal generated (reflected) by a moving target, defined by the equation:

$$f_d = -2*f_c*\upsilon/c \quad (2),$$

where, $f_c$ is the carrier frequency, $\upsilon$ is the target range rate, and c is the speed of light.

In equation (1), the $-a*r$ term drops out when the radar signal slope is zero, leaving only the component due to target range rate to define the reflected signal frequencies. Since a fixed-frequency continuous-wave (CW) radar signal slope is zero, this type of radar signal is accordingly used to realize the benefits described above relating to surface clutter.

In processing the reflected fixed-frequency CW radar signals, control computer 16 is preferably operable to transform the time-dependent reflected signals to the frequency domain using a suitable known transform strategy. In one embodiment, control computer 16 preferably includes a discrete fast Fourier transform (FFT) algorithm for converting the detected radar signal sample amplitudes to corresponding discrete power levels distributed over a number of corresponding discrete frequency bins. It is to be understood, however, that the present invention contemplates using other known frequency domain transform strategies, and that such other frequency domain transform strategies are intended to fall within the scope of the present invention. Once the reflected radar signals detected by antenna unit 14 are transformed to the frequency domain, control computer 16 is then preferably responsive to the vehicle speed signal provided by the vehicle speed sensor 20 to determine a number of Doppler frequency bins near or about that corresponding to vehicle speed preferably using one or more known techniques therefore.

As illustrated in FIG. 3, power amplitudes at Doppler frequencies near vehicle platform speed $V_p$ contain surface clutter information relating to both mainbeam clutter (MBC) and sidelobe clutter (SLC), with the mainbeam clutter peak generally occurring at a frequency corresponding to that of the vehicle platform speed $V_p$. By transmitting fixed-frequency CW radar signals via antenna unit 14, the power in the mainbeam clutter signal is enhanced over that in the sidelobe clutter signal in Doppler frequencies around $V_p$, such that the mainbeam clutter peak in a normally operating radar system is significantly greater than the sidelobe clutter peak. If, on the other hand, the MBC peak is sufficiently attenuated, this is an indication that the antenna unit 14 is at least partially blocked or obstructed. Control computer 16 is therefore preferably operable to process the reflected radar power signal 60 over Doppler frequency bins at or near vehicle speed $V_p$ to determine the mainbeam clutter peak, and to compare the MBC peak power value with a pre-established power threshold $P_{TH}$. If the MBC peak power value is greater than $P_{TH}$, control computer 16 is operable to determine that the antenna unit 14 is not blocked and is operating normally. If, however, control computer 16 determines that the MBC peak power value is less than $P_{TH}$, control computer 16 is operable to determine that the antenna unit 14 is at least partially blocked or obstructed. The power threshold $P_{TH}$ is preferably a predetermined power value stored in memory 18, although the present invention contemplates updating $P_{TH}$ over the life of the radar system to thereby compensate for operational variances thereof. In order to minimize excessive switching between no blockage and partial blockage determinations, the power threshold $P_{TH}$ preferably represents a band of power values having a maximum power value and a minimum power value to provide hysteresis in the switching function. In this embodiment, control computer 16 thus preferably operable to determine that antenna unit 14 is at least partially blocked or obstructed if the MBC peak power drops below the minimum power value of $P_{TH}$, and to determine that antenna unit 14 is not blocked or obstructed if the MBC peak power rises above the maximum power value of $P_{TH}$.

Figure 4:
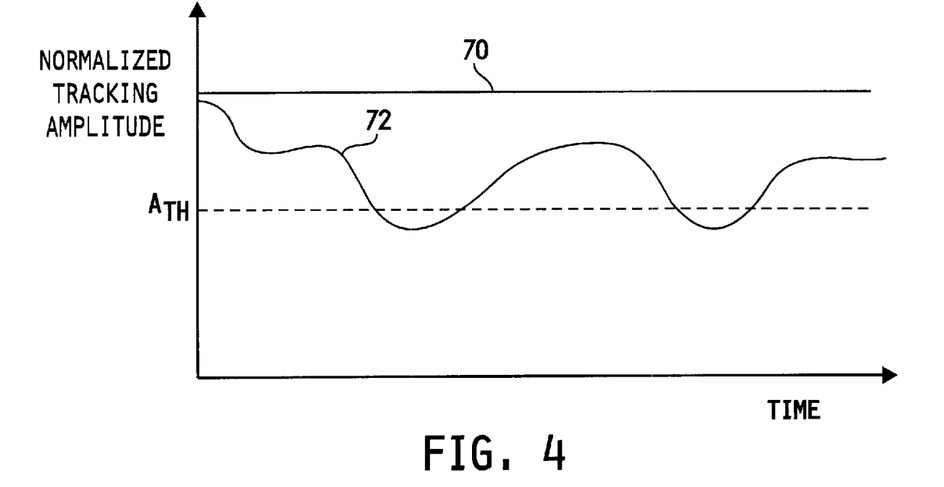
FIG. 4 is a plot of normalized tracking amplitude vs. time illustrating a strategy for detecting another radar blockage parameter, in accordance with the present invention.

Referring now to FIG. 4, a plot of normalized tracking amplitude vs. time is shown illustrating a preferred strategy for detecting another radar blockage parameter, in accordance with the present invention. In this embodiment, control computer 16 is operable in a normal known radar system operating state to track target information; e.g., range, relative velocity, etc. In accordance with the present invention, control computer 16 is preferably operable to store at least some of the amplitudes of the detected radar reflections (i.e., tracking amplitudes) within memory 18. In one embodiment, for example, control computer 16 is operable to maintain at any one time the N most recent tracking amplitudes, wherein N may be any positive integer (e.g., 10). Other tracking amplitude storage strategies will occur to those skilled in the art, and such other strategies are intended to fall within the scope of the present invention.

In any case, control computer 16 is preferably operable with this strategy to normalize the stored tracking amplitudes to a predefined range (e.g., 100 meters), and then to filter the normalized tracking amplitudes with a known smoothing filter to produce a smoothed tracking amplitude. If the radar antenna unit 14 is functioning properly (i.e., no antenna blockage or obstruction), the smoothed tracking amplitude should be constant over time (or over all samples) as illustrated by waveform 70 in FIG. 4. However, if the radar antenna unit 14 is blocked or obstructed, the tracking amplitudes will typically be variably attenuated so that the smoothed tracking amplitude will generally not be constant over time (or over all samples) as illustrated by waveform 72 in FIG. 4. In accordance with this strategy, control computer 16 is operable to determine that the antenna unit 14 is functioning properly and is therefore not blocked or obstructed as long as the smoothed tracking amplitude is greater than a predefined amplitude threshold $A_{TH}$. If, however, control computer 16 determines that the smoothed tracking amplitude is less than the amplitude threshold $A_{TH}$, control computer 16 is operable to determine that the radar antenna unit 14 is at least partially blocked or obstructed. The amplitude threshold $A_{TH}$ is preferably a predefined threshold value stored in memory unit 18, although the present invention contemplates at least periodically calibrating the value of $A_{TH}$ using any known technique and/or strategy therefore.

Figure 5A:
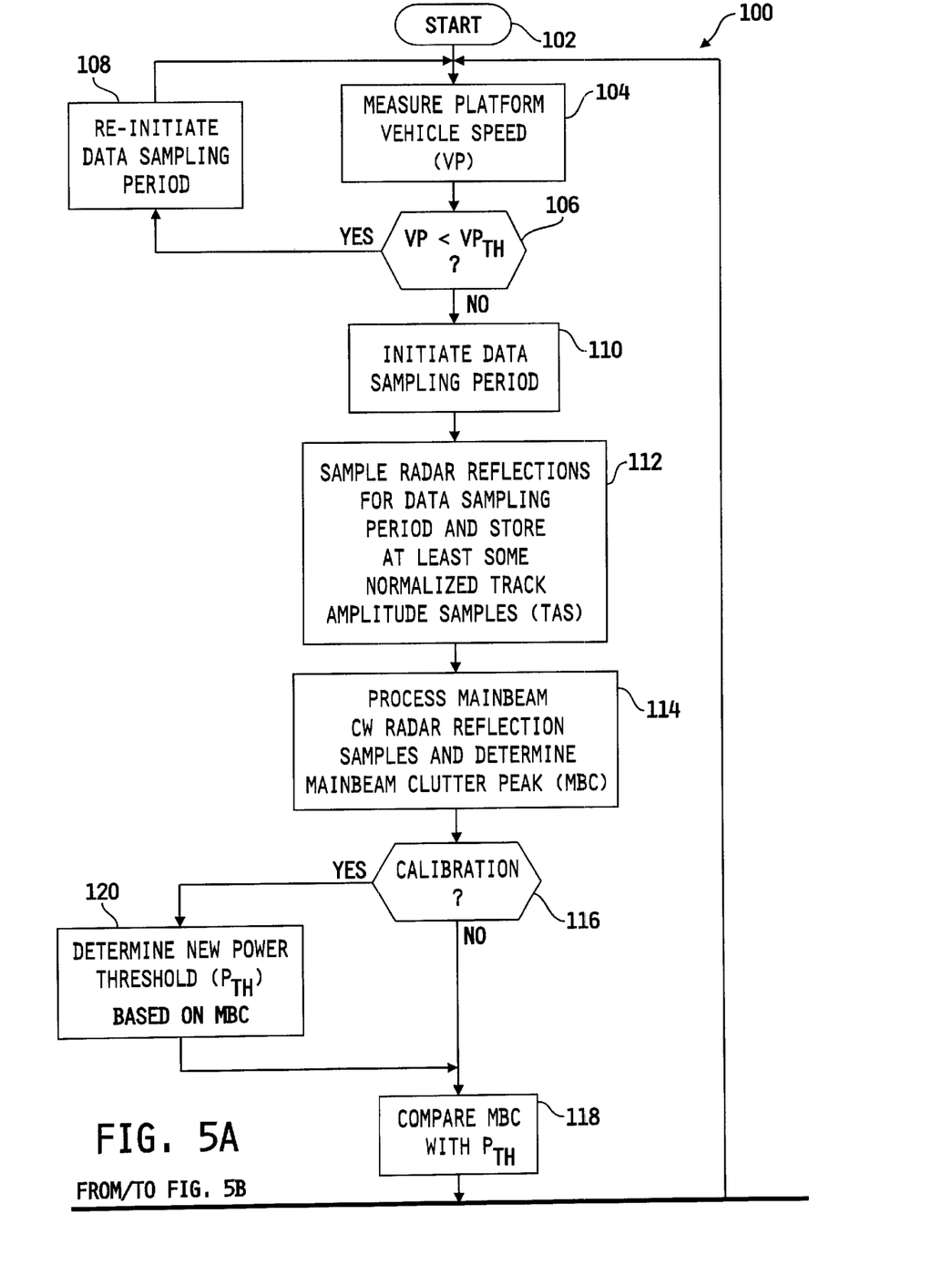
FIGS. 5A and 5B show a flowchart illustrating one preferred embodiment of a software algorithm for detecting radar blockage with the system of FIG. 1 using at least the strategies illustrated and described with respect to FIGS. 3 and 4, in accordance with the present invention.
Figure 5B:
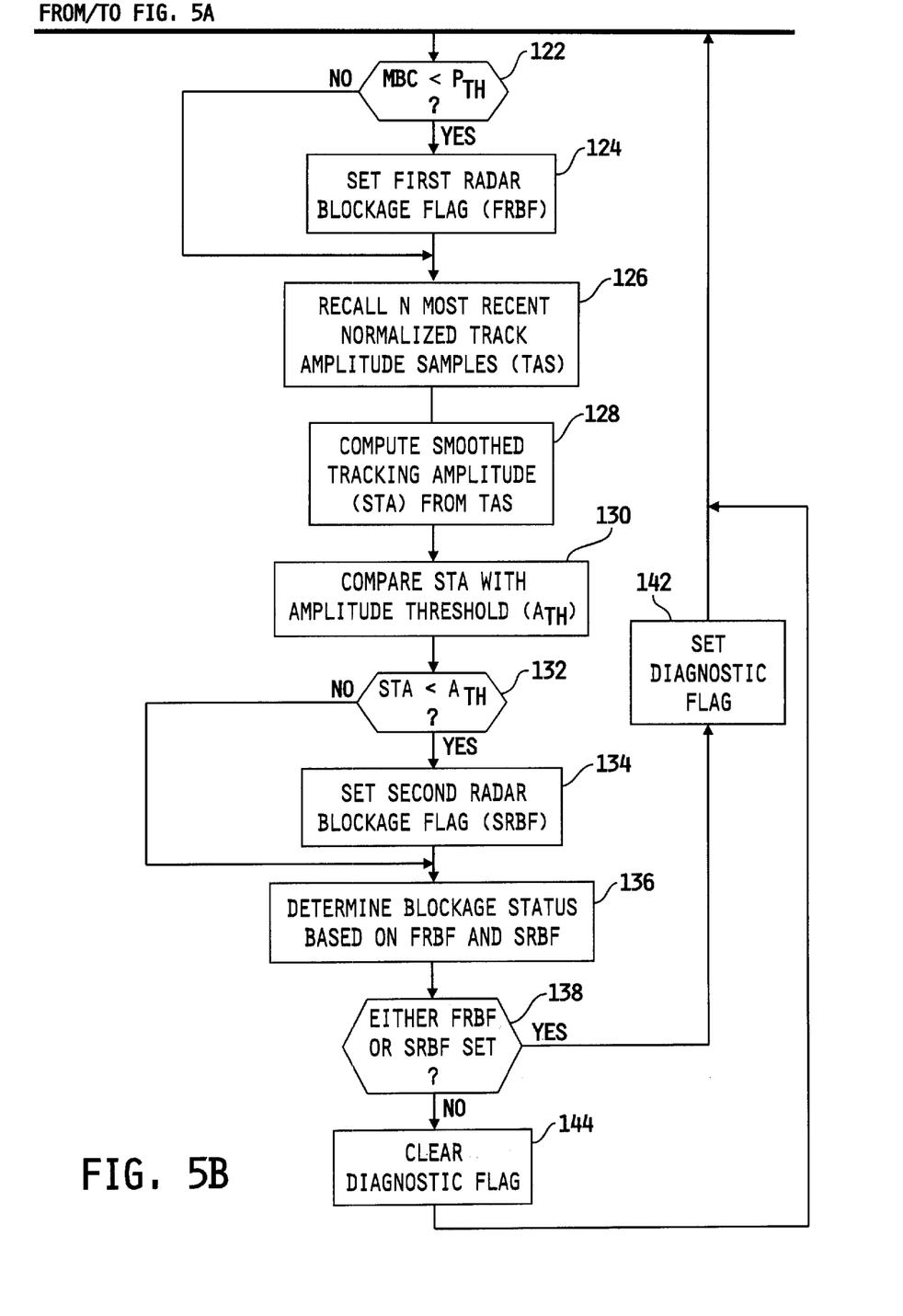

The present invention contemplates that either one, or a combination, of the two radar blockage or obstruction strategies shown and described with respect to FIGS. 3 and 4 may be used to determine a radar blockage state of antenna unit 14. In this regard, a flowchart illustrating one preferred embodiment of a software algorithm 100 for determining whether the antenna unit 14 is at least partially blocked is shown in FIGS. 5A–5B. Algorithm 100 is preferably stored within memory unit 18 and executed by control computer 16. Referring now to FIG. 5A, algorithm 100 begins at step 102, and at step 104 control computer 16 is operable to measure the platform vehicle speed VP, preferably by monitoring the vehicle speed signal produced by vehicle speed sensor 20. Thereafter at step 106, control computer 16 is operable to compare VP with a threshold vehicle speed $VP_{TH}$. If VP is less than $VP_{TH}$, meaning that the travelling speed of vehicle 12 is below a predefined speed threshold, algorithm execution advances to step 108 where control computer 16 is operable to re-initiate the data sampling period and loop therefrom to step 104. If, however, control computer 16 determines at step 106 that the vehicle travelling speed VP is greater than or equal to $VP_{TH}$, algorithm execution advances to step 110 where control computer 16 initiates the data sampling period. Preferably control computer 16 is operable to execute step 110 by initializing all internal variables and parameters to boot-up conditions.

Following step 110, control computer 16 is operable at step 112 sample reflected radar signals that are detected by antenna unit 14 and to store the amplitudes of a number of normalized tracking samples thereof. Preferably, control computer 16 is operable at step 112 to maintain the N most recent tracking amplitude samples in memory unit 18, wherein N may be any positive integer, and to normalize the stored amplitude values to a predefined range; e.g., 100 meters. However, those skilled in the art will recognize other techniques for maintaining a history of normalized tracking amplitude values in memory unit 18, and such other techniques are intended to fall within the scope of the present invention. In any case, algorithm execution advances from step 112 to step 114 where control computer 16 is operable to process the mainbeam CW radar refection signal samples and determine therefrom a mainbeam clutter peak (MBC) preferably in a manner described hereinabove with respect to FIG. 3. Thereafter at step 116, control computer 16 is operable to determine whether algorithm 100 is operating in a calibration mode. If so, algorithm execution advances to step 120 where control computer 16 is operable to determine a new power threshold value $P_{TH}$, preferably based on the amplitude of the mainbeam clutter peak (MBC) and/or the amplitude of the sidelobe clutter peak (SLC). Preferably, such a calibration mode is operable only when it is known that no antenna unit blockages or obstructions exist. From step 120, or from the "no" branch of step 116, algorithm execution advances to step 118.

At step 118, control computer 16 is operable to compare the mainbeam clutter peak (MBC) with the power threshold value $P_{TH}$. Thereafter at step 122, control computer 16 is operable to determine whether MBC is less than $P_{TH}$. If so, control computer 122 is preferably operable to set a first radar blockage flag (FRBF). From step 124, or from the "no" branch of step 122, algorithm execution advances to step 126 where control computer 16 is operable to recall the N most recent normalized tracking amplitude samples (TAS) from memory unit 18, wherein N may be any positive integer less than or equal to the total number of normalized tracking amplitude samples stored within memory unit 18. Thereafter at step 128, the N normalized tracking samples are smoothed by a known smoothing filter for the purpose of preventing false alarms due to random amplitude fluctuations not caused by blockage or obstruction of antenna unit 14. In one embodiment, control computer 16 includes a known software low-pass filter, and control computer 16 is thus operable to execute step 128 by passing the N normalized tracking samples through the low-pass filter to produce a smoothed tracking amplitude (STA). Those skilled in the art will recognize other techniques for providing the smoothing function of step 128, and such other techniques are intended to fall within the scope of the present invention.

In any case, algorithm execution advances from step 128 to step 130 where control computer 16 is operable to compare the smoothed tracking amplitude (STA) with a predefined amplitude threshold $A_{TH}$ as described hereinabove with respect to FIG. 4. Thereafter at step 132, control computer 16 is operable to determine whether STA is less than $A_{TH}$. If so, algorithm execution advances to step 134 where control computer 16 is operable to set a second radar blockage flag (SRBF). Algorithm execution advances from step 134, or from the "no" branch of step 132, to step 136.

Figure 6:
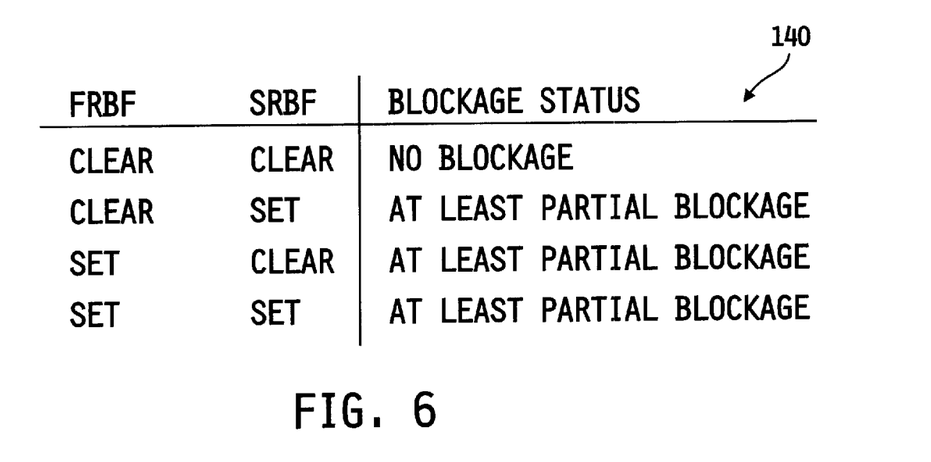
FIG. 6 is a table illustrating one preferred embodiment of a strategy for determining a radar blockage state based on at least the two radar blockage parameters illustrated in FIGS. 3 and 4.

Control computer 16 is operable at step 136 to determine a blockage status of the antenna unit 14 based on the status of the radar blockage flags FRBF and SRBF. Referring to FIG. 6, a truth table 140 is shown illustrating one preferred embodiment of step 136 of algorithm 100. In this embodiment, control computer 16 is operable at step 136 to determine that no antenna unit blockage or obstruction exists if both of the first and second radar blockage flags are clear; i.e., not set. If, on the other hand, either of the first and second radar blockage flags are set, control computer 16 is operable to determine that the antenna unit 14 is at least partially blocked or obstructed. Those skilled in the art will recognize that the truth table 140 may be variously configured to define one or more antenna unit blockage states. For example, one alternate embodiment may define a "no blockage" state if both FRBF and SRBF are clear, an "at least partially blocked" state if one or the other of FRBF and SRBF are set, and a "totally blocked" state if both FRBF and SRBF are set. It is to be understood that any such alternate configurations of truth table 140 are intended to fall within the scope of the present invention. Likewise, any alternate technique for defining the blockage status as a function of FRBF and/or SRBF is intended to fall within the scope of the present invention, wherein examples of such alternate techniques may include, but are not limited to, tables, graphs, one or more equations, and the like.

In any case, algorithm execution advances from step 136 to step 138 where control computer 16 is operable to determine whether either of the first and second radar blockage flags FRBF or SRBF are set. If so, algorithm execution advances to step 142 where control computer 16 is operable to set a diagnostic flag. Control computer 16 or another control circuit external thereto is preferably operable to activate a warning indicator in the passenger compartment of the vehicle 12 to thereby provide the vehicle operator with an indication that the antenna unit 14 is at least partially blocked or obstructed. If, on the other hand, control computer 16 determines at step 138 that neither FRBF nor SRBF is set, then one of at least three scenarios has occurred; (1) antenna unit 14 is not or was not blocked or obstructed, (2) antenna unit 14 was blocked or obstructed, but was purposely unblocked or unobstructed by an individual pursuant to a warning resulting from setting of the diagnostic flag, or (3) antenna unit 14 was blocked or obstructed, but was automatically unblocked or unobstructed through a natural occurrence. In any of these cases, algorithm execution advances to step 144 where control computer 16 is operable to clear the diagnostic flag. Algorithm execution loops back to step 104 following execution of either of steps 142 or 144.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected.

What is claimed is:

1. System for detecting radar blockage, comprising:
    a radar unit having an antenna configured for transmitting radar signals and for receiving reflected radar signals;
    a vehicle speed sensor producing a vehicle speed signal indicative of a travelling speed of a vehicle carrying said radar unit; and
    a control computer responsive to at least some of said reflected radar signals to compute a relative radar power signal as a function of frequency, said control computer responsive to said vehicle speed signal to determine a mainbeam clutter peak of said relative radar power signal along a number of Doppler frequencies defined by said travelling speed, said control computer setting a first radar blockage flag if said mainbeam clutter peak is below a power threshold value.

2. The system of claim 1 wherein said at least some of said reflected radar signals correspond to continuous wave radar signals.

3. The system of claim 1 wherein said control computer is operable to determine said relative radar power signal by transforming said at least some of said reflected radar signals along discrete frequency bins.

4. The system of claim 3 wherein said control computer is operable to determine said mainbeam clutter peak as a maximum value of said relative radar power signal among a number of said discrete Doppler frequency bins defined by said travelling speed.

5. The system of claim 1 wherein said control computer is operable to determine that said radar antenna is at least partially blocked if said first radar blockage flag is set.

6. The system of claim 1 wherein said control computer is responsive to said reflected radar signals to track at least one object external to said vehicle, said control computer normalizing corresponding tracking amplitudes of said reflected radar signals to a predefined tracking distance and filtering said normalized tracking amplitudes to produce a smoothed tracking amplitude, said control computer setting a second radar blockage flag if said smoothed tracking amplitude drops below an amplitude threshold value.

7. The system of claim 6 wherein said control computer is operable to determine a radar blockage state associated with said antenna as a function of said first and second radar blockage flags.

8. The system of claim 7 wherein said control computer is operable to determine that said antenna is at least partially blocked if either of said first and second radar blockages flags is set.

9. System for detecting radar blockage, comprising:
    a radar unit carried by a motor vehicle, said radar unit having an antenna configured for transmitting radar signals and for receiving reflected radar signals; and
    a control computer responsive to said reflected radar signals to track at least one object external to said vehicle, said control computer normalizing corresponding tracking amplitudes of said reflected radar signals to a predefined tracking distance and filtering said normalized tracking amplitudes to produce a smoothed tracking amplitude, said control computer setting a first radar blockage flag if said smoothed tracking amplitude drops below an amplitude threshold value.

10. The system of claim 9 wherein said control computer is operable to determine that said antenna is at least partially blocked if said first radar blockage flag is set.

11. The system of claim 9 further including a speed sensor producing a speed signal indicative of a travelling speed of said vehicle;
    wherein said a control computer is operable to transform at least some of said reflected radar signals to relative radar power signals as a function of frequency, said control computer responsive to said speed signal to determine a mainbeam clutter peak of said relative radar power signal along a number of Doppler frequencies defined by said travelling speed, said control computer setting a second radar blockage flag if said mainbeam clutter peak is below a power threshold value.

12. The system of claim 11 wherein said at least some of said reflected radar signals correspond to continuous wave radar signals.

13. The system of claim 11 wherein said control computer is operable to determine a radar blockage state associated with said antenna as a function of said first and second radar blockage flags.

14. The system of claim 13 wherein said control computer is operable to determine that said antenna is at least partially blocked if either of said first and second radar blockages flags is set.

15. A method for detecting radar blockage, comprising the steps of:
    transmitting a radar signal with a radar system carried by a motor vehicle;
    receiving reflected radar signals resulting from said transmitting step;

processing said reflected radar signals to produce a relative power signal as a function of frequency;

determining a mainbeam clutter peak of said relative power signal based on a number of frequencies corresponding to those about a travelling speed of said vehicle; and setting a first radar blockage flag if said mainbeam clutter peak is below a power threshold value.

16. The method of claim 15 further including the steps of:

processing said reflected radar signals to track at least one object external to said vehicle;

normalizing corresponding tracking amplitudes of said reflected radar signals to a predefined tracking distance;

filtering said normalized tracking amplitudes to produce a smoothed tracking amplitude; and setting a second radar blockage flag if at least said smoothed tracking amplitude drops below an amplitude threshold value.

17. The method of claim 16 further including the step of determining a blockage state of said radar system as a function of said first and second radar blockage flags.

18. A method for detecting radar blockage, comprising the steps of:

transmitting a radar signal with a radar system carried by a motor vehicle;

receiving reflected radar signals resulting from said transmitting step;

processing said reflected radar signals to track at least one object external to said vehicle;

normalizing corresponding tracking amplitudes of said reflected radar signals to a predefined tracking distance;

filtering said normalized tracking amplitudes to produce a smoothed tracking amplitude; and setting a first radar blockage flag if at least said smoothed tracking amplitude drops below an amplitude threshold value.

19. The method of claim 18 further including the steps of:

processing said reflected radar signals to produce a relative power signal as a function of frequency;

determining a mainbeam clutter peak of said relative power signal based on frequencies corresponding to those about a travelling speed of said vehicle; and setting a second radar blockage flag if said mainbeam clutter peak is below a power threshold value.

20. The method of claim 19 further including the step of determining a blockage state of said radar system as a function of said first and second radar blockage flags.

* * * * *